United States Patent [19]

Foisy

[11] Patent Number: 5,152,492
[45] Date of Patent: Oct. 6, 1992

[54] VIEWGRAPH MOUNT

[76] Inventor: Donna J. Foisy, PSC #1, Box 1677, APO San Francisco, Calif. 96293

[21] Appl. No.: 527,870

[22] Filed: May 24, 1990

[51] Int. Cl.⁵ .............................. A47F 7/14
[52] U.S. Cl. .................. 248/488; 40/159.2
[58] Field of Search .............. 248/488, 689, 121, 154, 248/220.2, 223.4; 40/360, 359, 159.2, 158.1; 434/199, 430; 350/117

[56] References Cited

U.S. PATENT DOCUMENTS

| | | | |
|---|---|---|---|
| 2,452,231 | 10/1948 | Dobie, Jr. | 40/359 |
| 2,739,401 | 3/1956 | Balter | 40/159.2 |
| 4,282,668 | 8/1981 | Jolkovski | 248/488 X |
| 4,361,974 | 12/1982 | Wood | 40/159.2 |
| 4,419,837 | 12/1983 | Meeker | 40/359 |
| 4,542,286 | 9/1985 | Golarz | 40/360 X |
| 4,620,383 | 11/1986 | Janssen | 40/359 X |
| 4,685,785 | 8/1987 | Mundt et al. | 40/158.1 X |

Primary Examiner—Ramon O. Ramirez
Attorney, Agent, or Firm—Michael I. Kroll

[57] ABSTRACT

The present invention relates to a mount for a viewgraph. The mount includes a frame and a plurality of tabs disposed in the frame for holding the viewgraph to the frame in proper alignment so that the viewgraph is removably and interchangeably mounted to the frame without incurring any damage to the frame.

4 Claims, 1 Drawing Sheet

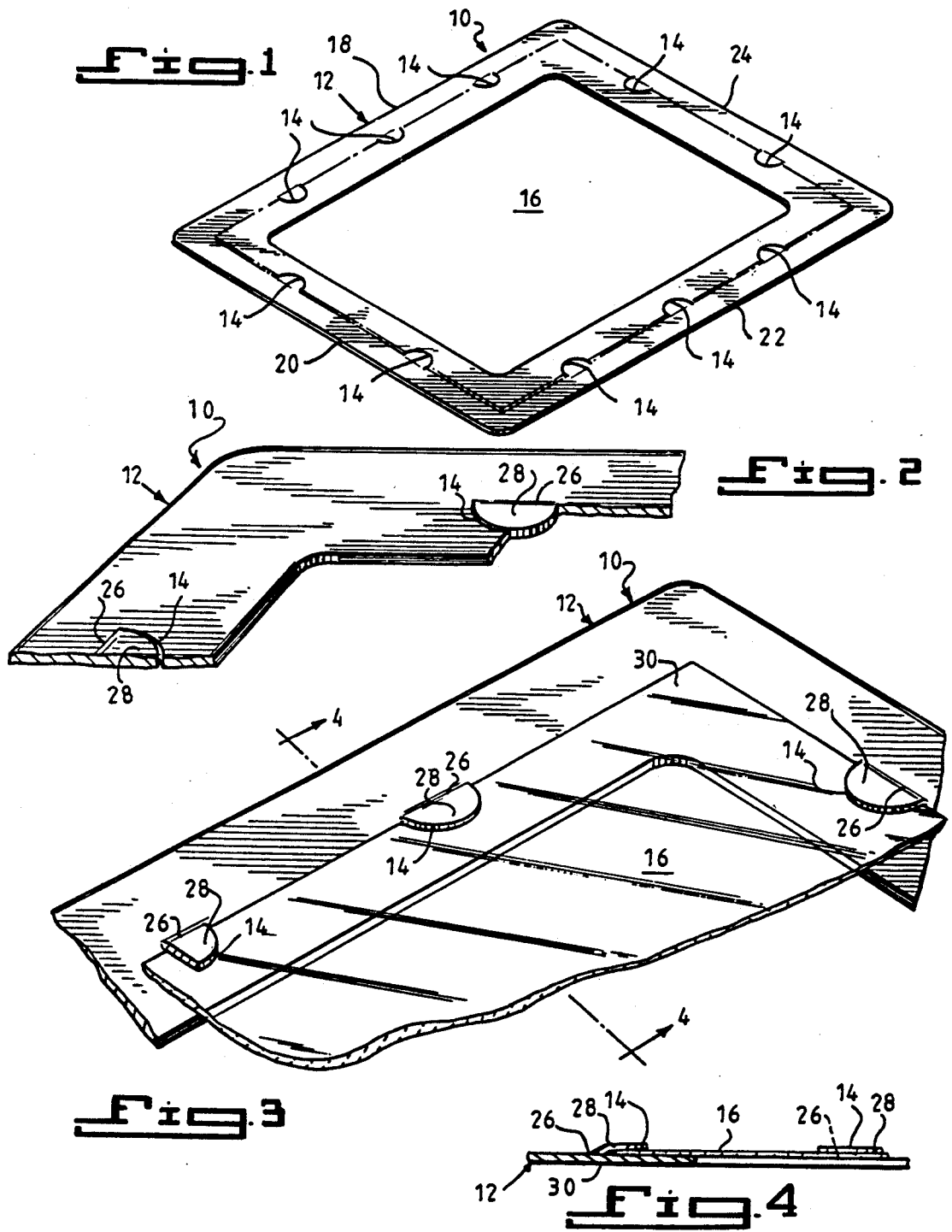

VIEWGRAPH MOUNT

BACKGROUND OF THE INVENTION

1. Field of the Invention

The present invention relates to a viewgraph mount.

More particularly, the present invention relates to a viewgraph mount whose viewgraphs are readily interchangeable from the mount without using glue, tape, or etc.

2. Description of the Prior Art

Numerous innovations for viewgraphs mounts have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provided a viewgraph mount that avoids the disadvantages of the prior art.

More particularly, it is an object of the present invention to provide a viewgraph mount that alleviates the need for taping the viewgraph to the mount so that the wear and tear on the mount is lessened and the mount has a longer shelf life.

The present invention also reduces the manhours required for taping the viewgraphs to the mount. Furthermore, the present invention reduces the cost of the mount because the mount would not have to be replenished, as often.

In keeping with these objects, and with others which will become apparent hereinafter, one feature of the present invention resides, briefly stated, in a mount for viewgraph, having a frame and wherein means are disposed on the frame for holding the viewgraph to the frame in proper alignment.

When the viewgraph mount is designed in accordance with the present invention, the viewgraph is removably and interchangeably mounted to the frame without incurring any damage to the frame.

In accordance with another feature of the present invention, the holding means include a plurality of half moon slits contained in the frame.

Another feature of the present invention is that each of the plurality of half moon slits include a hemispherically shaped portion defined by the half moon slit, and a pivot line so that the hemispherically shaped portion assists in keeping the viewgraph in proper alignment.

Yet another feature of the present invention is that the frame and the integral hemispherically shaped portions are of one homogeneous piece of material.

Still another feature of the present invention is that the material can be uncorrugated cardboard.

Yet still another feature of the present invention is that the frame and the hemispherically shaped portions "sandwich" the viewgraph therebetween, without any obstruction of the information displayed on the viewgraph.

The novel features which are considered characteristic for the invention are set forth in particular in the appended claims. The invention itself, however, both as to its construction and its method of operation, together with additional objects and advantages thereof, will be best understood from the following description of the specific embodiments when read in the connection with the accompanying drawing.

BRIEF DESCRIPTION OF THE DRAWING

FIG. 1 is a front perspective view of the viewgraph mount of the present invention, with the viewgraph shown in the phantom;

FIG. 2 is a partial perspective view of a section of the frame of the viewgraph mount of the present invention, as shown in FIG. 1;

FIG. 3 is a partial perspective view of a section of the frame of the viewgraph mount of the present invention, using the half moon slits to hold the viewgraph in proper position; and FIG. 4 is a cross sectional view of the viewgraph mount of the present invention, taken along line 4—4 in FIG. 3.

LIST OF REFERENCE NUMERALS UTILIZED IN THE DRAWING

10—viewgraph mount of the present invention
12—frame of the viewgraph mount 10
14—plurality of half moon slits in the frame 12
16—viewgraph that is insertable in the viewgraph mount 10
30—border of the viewgraph 16
18—top portion of the frame 12
20—first portion of the frame 12
22—bottom portion of the frame 12
24—second side portion of the frame 12
26—pivot line of the hemispherically shaped portion 28
28—hemispherically shaped portion of each of the plurality of half moon slits in the frame 12

DETAILED DESCRIPTION OF THE PREFERRED EMBODIMENT

Referring now to FIG. 1, the viewgraph mount of the present invention is shown generally at 10 and includes a frame 12 containing a plurality of half moon slits 14. The plurality of half moon slits 14 hold the viewgraph 16, shown in the phantom, in proper alignment in the viewgraph mount 10. The viewgraph 16 is "sandwiched" between the frame 12, and the plurality of half moon slits 14.

The frame 12 has a top 18, a first side portion 20, a bottom portion 22, and second side portion 24. qp As As shown in FIG. 2, the half moon slits 14 are substantially hemispherically shaped. The hemispherically shaped portions 28 are cut in the frame and are pivotable about lines 26. Since the hemispherically shaped portions 28 are cut in the frame 12, then the frame 12 and the hemispherically shaped portions 28 are of one homogeneous piece of material, preferably non-corrugated cardboard with its inherent resiliency.

As can be seen in FIGS. 3 and 4, the border of the viewgraph 16 is inserted between the frame 12 and the hemispherically shaped portions 28. The hemispherically shaped portions 28 have been pivoted slightly upwardly about the pivot lines 26.

The half moon slits 14 are cut in the frame 12, in the quantity that is necessary. The top portion 18 of the frame 12 contains three half moon slits 14. The bottom portion 22 of the frame 12 contains three half moon slits 14. The first side portion 20 of the frame 12 contains two half moon slits 14. And, the second side portion 24 of the frame 12 contains two half moon slits 14.

The quantity of the half moon slits 14 necessary for different sized viewgraphs 16 and for the corresponding frames 12, can easily be obtained by interpolation of the empirical data captured during experimentation.

In operation, the hemispherically shaped portions 28 of the half moon slits 14 are raised slightly about the pivot lines 26. The viewgraph 16 is then placed on the frame 12 and inserted beneath the hemispherically shaped portions 28 so that the viewgraph 16 becomes "sandwiched" between the frame 12 and the hemispherically shaped portions 28. In this manner, the viewgraphs 16 is in alignment for proper viewing of the information disposed on the viewgraph 16. To remove the viewgraph 16 from the frame 12, one merely slides the viewgraph 16 out from under the hemispherically shaped portions 28.

As can be seen, supra, no tape, glue, staples, or etc. are necessary to secure the viewgraph 16 to the frame 12. The present invention 10 allows the viewgraph 16 to be interchangeable in the frame 12. That is, one frame 12 can be used, if necessary, for a plurality of viewgraph 16, without damaging the viewgraph mount 10 of the present invention.

For at least aesthetic purposes, the viewgraph 16 contains a border 30 that is free of information so that the hemispherically shaped portions 28 of the frame 12 do not obstruct any information on the viewgraphs 16.

It will be understood that each of the elements described above, or two or more together, may also find a useful application in other types of constructions differing from the type described above.

While the invention has been illustrated and described as embodied in a viewgraph mount, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A mount for a viewgraph, comprising:
   a) a frame having four sides and a central opening, each of said four sides having a thickness, said thickness of said each of said four sides being equal and void of recesses; and
   b) means disposed in said frame for holding a viewgraph to said frame in proper alignment so that the viewgraph is removably and interchangeably mounted to said frame without damaging said frame, said holding means including a plurality of half moon slits cut in said frame and a pivot line for each of said plurality of said half moon slits, said each of said plurality of half moon slits and each of said pivot lines define a hemispherically shaped portion that keeps the viewgraph in proper alignment, said hemispherically shaped portions being on said four sides of said frame and being disposed a distance back from said central opening of said frame so that the viewgraph rests directly on said frame and is merely slipped under said hemispherically shaped portions of said frame and is held in place.

2. A mount as defined in claim 1, wherein said frame and said hemispherically shaped portions are of one homogeneous piece of material.

3. A mount as defined in claim 2, wherein said material can be non-corrugated cardboard.

4. A mount as defined in claim 2, wherein said frame and said hemispherically shaped portions "sandwich" the viewgraph therebetween without any obstruction of the information displayed on the viewgraph when the viewgraph is mounted to said frame.

* * * * *